(12) United States Patent
Konagai (10) Patent No.: US 10,860,287 B2
(45) Date of Patent: Dec. 8, 2020

(54) SOUND OUTPUT DEVICE AND SOUND OUTPUT METHOD

(71) Applicant: Yamaha Corporation, Hamamatsu (JP)

(72) Inventor: Yusuke Konagai, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 16/655,441

(22) Filed: Oct. 17, 2019

(65) Prior Publication Data

US 2020/0125318 A1   Apr. 23, 2020

(30) Foreign Application Priority Data

Oct. 18, 2018 (JP) .................. 2018-196413

(51) Int. Cl.

| | |
|---|---|
| *G06F 3/16* | (2006.01) |
| *G10K 11/178* | (2006.01) |
| *H04R 1/10* | (2006.01) |
| *H04R 3/00* | (2006.01) |
| *H04R 1/40* | (2006.01) |
| *H04R 29/00* | (2006.01) |
| *H04R 3/04* | (2006.01) |

(52) U.S. Cl.
CPC ........ *G06F 3/165* (2013.01); *G10K 11/17881* (2018.01); *H04R 1/1041* (2013.01); *H04R 1/406* (2013.01); *H04R 3/005* (2013.01); *H04R 3/04* (2013.01); *H04R 29/001* (2013.01); *G10K 2210/1081* (2013.01); *G10K 2210/3044* (2013.01)

(58) Field of Classification Search
CPC .............. G06F 3/165; G10K 11/17881; G10K 2210/1081; G10K 2210/3044; H04R 1/1041; H04R 29/001; H04R 1/406; H04R 3/005

See application file for complete search history.

(56) References Cited

U.S. PATENT DOCUMENTS

| | | |
|---|---|---|
| 2017/0142522 A1 | 5/2017 | Hayashi et al. |
| 2018/0115815 A1* | 4/2018 | Kumar ................ H04R 1/1041 |
| 2018/0249266 A1* | 8/2018 | Termeulen .......... H04R 1/1083 |

FOREIGN PATENT DOCUMENTS

JP       2016-15585 A     1/2016

* cited by examiner

*Primary Examiner* — Regina N Holder
(74) *Attorney, Agent, or Firm* — Crowell & Moring LLP (57) ABSTRACT

A sound output device includes: a first imparter that imparts first sound characteristics to an input signal; a loudspeaker that outputs a sound based on a signal obtained by impartation of the first sound characteristics to the input signal; a first microphone that receives a sound based on the sound output by the loudspeaker; a determiner that obtains difference characteristics between frequency characteristics of the input signal and frequency characteristics of a signal derived from the sound received by the first microphone, to determine whether the difference characteristics fall within a predetermined range from target sound characteristics; and an instruction indicator that outputs an instruction for output of an alert if a result of the determination by the determiner is negative, and the first imparter corrects the first sound characteristics based on the difference characteristics if a result of the determination by the determiner is positive.

12 Claims, 8 Drawing Sheets

SOUND OUTPUT DEVICE AND SOUND OUTPUT METHOD

CROSS REFERENCE TO RELATED APPLICATIONS

This application is based on and claims priority from Japanese Patent Application No. 2018-196413, filed Oct. 18, 2018, the entire content of which is incorporated herein by reference.

TECHNICAL FIELD

The present disclosure relates to sound output devices and sound output methods.

BACKGROUND

Sound characteristics may change depending on how sound output devices, such as headphone sets or earphones, are worn by listeners (i.e., wearers). Ear pads providing less sideways pressure that consequently are more comfortable for a listener to wear, and/or ear pads having well designed shape tend to be favored by listeners. If a listener does not properly wear sound output devices that employ such ear pads, target sound characteristics, as designed, may not be achieved. In addition to how a headphone set that includes ear pads is worn (wear-state), physical features of a listener, such as head shape, ear size, use of spectacles, and so forth may prevent target sound characteristics from being perceived by the listener.

As described in below, in the conventional art there is provided a technique for enabling target sound characteristics, to be perceived by a listener regardless of how a listener wears a headphone set that includes ear pads and also regardless of physical features of the listener. More specifically, by this technique, a difference is calculated between target playback characteristics upon reproduction of an input signal, and characteristics of sounds output based on a signal obtained by processing the input signal, where the characteristics of the output sounds are obtained from sounds received by a microphone provided inside the headphone set. The calculated difference is then used to process subsequent input signals. (See Japanese Patent Application Laid-Open Publication No. 2016-15585).

Despite application of such a technique, however, it may still not be possible to realize target sound characteristics where a listener wear-state substantially deviates from the intended norm, or physical features of a listener are more pronounced than anticipated threshold states. It is often the case that a listener of a sound output device is unable to judge whether target sound characteristics are being experienced by the listener.

SUMMARY

In one aspect, a sound output device according to the present disclosure includes: a first imparter configured to impart first sound characteristics to an input signal; a loudspeaker configured to output a sound based on a signal obtained by impartation of the first sound characteristics to the input signal by the first imparter; a first microphone configured to receive a sound based on the sound output by the loudspeaker; a determiner configured to obtain difference characteristics between frequency characteristics of the input signal and frequency characteristics of a signal derived from the sound received by the first microphone, and configured to determine whether the difference characteristics fall within a predetermined range from target sound characteristics; and an instruction indicator configured to output an instruction for output of an alert when a result of the determination by the determiner is negative, and the first imparter is further configured to correct the first sound characteristics based on the difference characteristics when a result of the determination by the determiner is positive.

DESCRIPTION OF THE EMBODIMENTS

A sound output device according to an embodiment of the present disclosure will now be described with reference to the drawings. The sound output device is typically a headphone set or an earphone. In a first embodiment, a headphone set will be explained as an example of the sound output device.

First Embodiment

Figure 1:
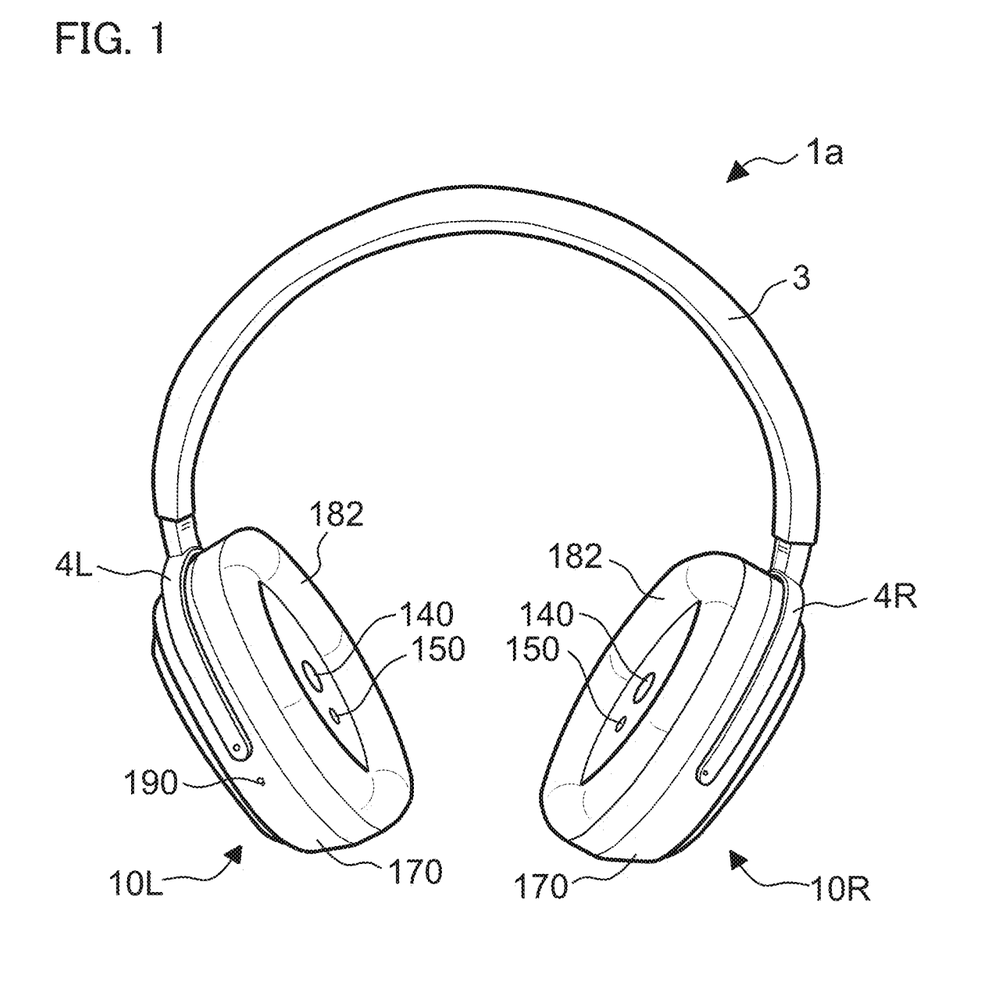
FIG. 1 is a diagram showing an external view of a headphone set according to a first embodiment.
Figure 2:
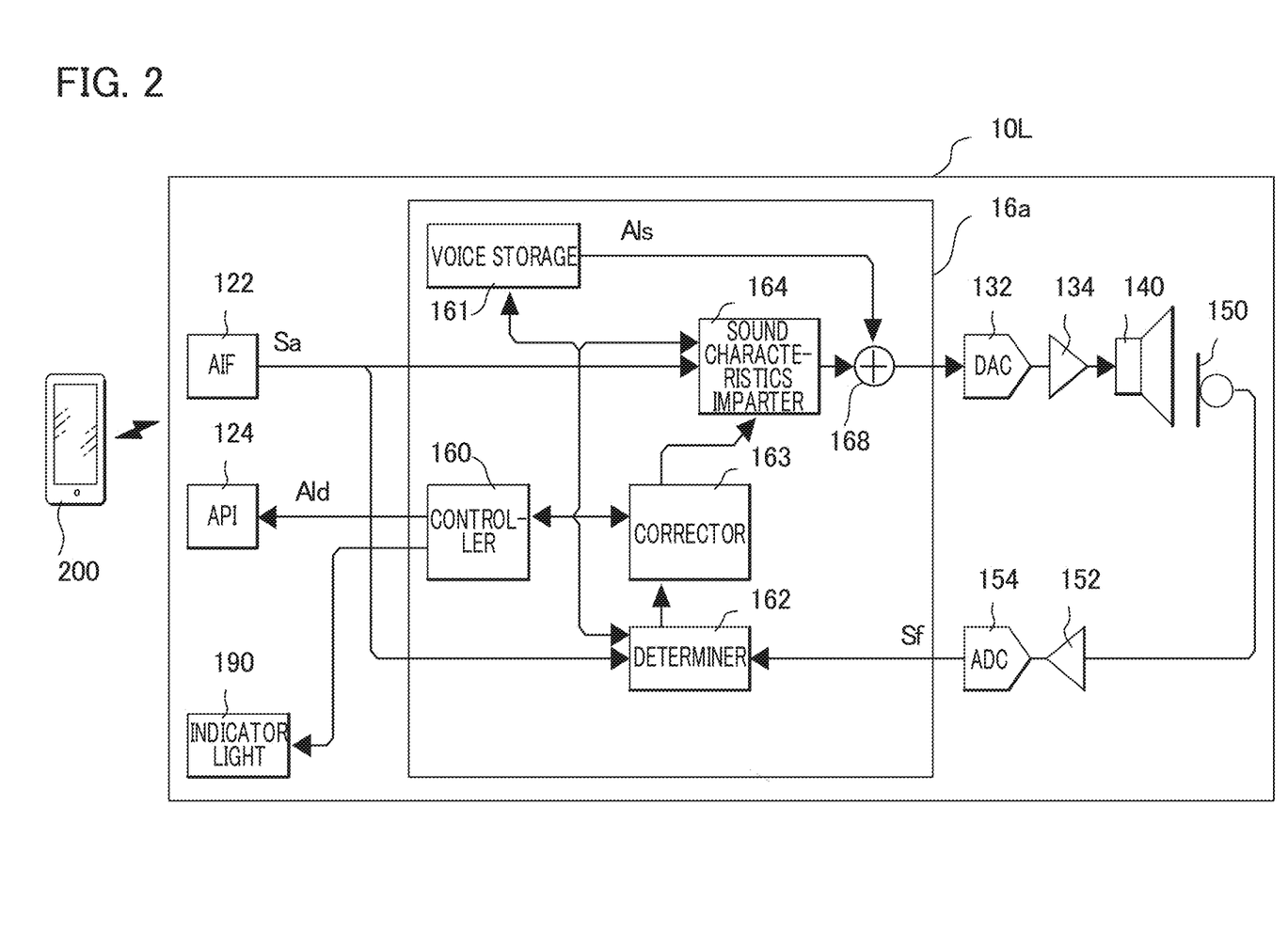
FIG. 2 is a block diagram showing a configuration of the headphone set.

FIG. 1 is a diagram showing an external view of a headphone set 1a, which is an example of a sound output device according to the first embodiment. FIG. 2 is a block diagram showing a configuration of the headphone set 1a for one of two channels.

As shown in FIG. 1, the headphone set 1a has headphone units 10L and 10R, a headband 3, and arms 4L and 4R. The headband 3 is made of an elastic metal or resin and is formed into an arc shape in a longitudinal direction. Of the two ends of the headband 3, one end (located on the left in the figure) is mounted to, via the arm 4L, the headphone unit 10L used for the left ear; and the other end (located on the right in the figure) is mounted to, via the arm 4R, the headphone unit 10R used for the right ear.

The headphone unit 10L includes a substantially cylindrical housing 170, a loudspeaker 140, a microphone 150, an ear pad 182, and an indicator light 190. The ear pad 182 is a ring-shaped cushion member for covering a listener's (i.e., wearer's) ear, and is detachable from the housing 170.

The loudspeaker 140 is mounted proximate to a center of the ring-shaped ear pad 182 of a surface of the housing 170 on which the ear pad 182 is mounted. The loudspeaker 140 provided on the headphone unit 10L converts left-channel stereo signals into sound for output of the sound. A microphone 150 (first microphone) is mounted proximate to the loudspeaker 140 on a surface of the housing 170, on which the ear pad 182 is mounted. The microphone 150 receives a sound output from the loudspeaker 140 in a closed space that is sealed by the ear pad 182 and an external ear canal of a listener. This closed space is formed when a listener wears the headphone set 1a.

The indicator light 190 is mounted on the housing 170, for example, and turns on when the headphone set 1a is worn improperly. The indicator light 190 serves to notify a listener that the headphone set 1a is improperly worn. During improper use of the headphone set 1a, the indicator light 190 may glow continuously or may flash. The color of the indicator light 190 may change depending on a wear-state of the headphone set 1a. For example, the light may glow or flash green during proper wear and glow or flash red during improper wear.

The headphone unit 10R includes a housing 170, a loudspeaker 140, a microphone 150, and an ear pad 182, similarly to the headphone unit 10L.

An electric circuit for the left ear in the headphone unit 10L and an electric circuit for the right ear in the headphone unit 10R are the same as each other, with the exception that an indicator light 190 is not provided in the headphone unit 10R. The electric circuit for the left ear, which is employed in the headphone unit 10L, will be described in the following as an example.

As shown in FIG. 2, the headphone unit 10L includes an audio interface (AIF) 122, an Application Programming Interface (API) 124, a signal processor 16a, a digital to analog converter (DAC) 132, amplifiers 134 and 152, a loudspeaker 140, a microphone 150, an analog to digital converter (ADC) 154, and an indicator light 190. The AIF 122 is an interface that receives digital signals from the external terminal 200 by radio, for example. A typical example of a signal received by the AIF 122 is an audio signal representative of content for reproduction at an external terminal 200 such that a sound of the audio signal is heard by a listener. The audio signal received by the AIF 122 is supplied as the signal Sa (i.e., an input signal) to the signal processor 16a.

The AIF 122 may receive signals by wire instead of receiving them by radio. The AIF 122 may receive analog signals instead of digital signals. When analog signals are received, the analog signals are converted to digital signals by a converter (not shown), for subsequent signal processing. In some embodiments, the AIF 122 receives from the external terminal 200 signals other than content signals. For example, in a case where an application program for controlling the headphone set 1a is executed at the external terminal 200, the AIF 122 receives signals indicative of various types of instructions performed relative to the application. Various instruction signals are supplied via a path (not shown) to the signal processor 16a.

The API 124 is an interface that transmits digital signals to the external terminal 200 by radio, for example. Examples of signals transmitted by the API 124 include a signal AId indicative of an improper wear-state of the headphone set 1a. The API 124 may transmit signals by wire instead of transmitting them by radio, similarly to the AIF 122.

The signal processor 16a is, for example, a Digital Signal Processor (DSP), and includes a controller 160, a voice storage device 161, a determiner 162, a corrector 163, a sound characteristics imparter 164, and an adder 168. In some embodiments, the signal processor 16a may be a microcomputer instead of by a DSP. Means other than the headphone set 1a may realize a part of the functions of the signal processor 16a, by way of, for example, software processing; an example of such means is the external terminal 200. Thus, a part or all of the processing to be performed by the signal processor 16a can be realized by an element other than the DSP and the microcomputer.

Of the different elements of the signal processor 16a, the controller 160, which is an example of an instruction indicator, has in addition to other functions a storage function and stores a variety of data, correction coefficients, computer programs, etc., in an internal memory thereof. The controller 160 controls the other elements of the signal processor 16a in accordance with the stored computer program. In some embodiments, the storage function may be realized by a memory storage device coupled to the controller 160. The voice storage device 161 stores a digital voice signal AIs representative of a voice, such as "the headphone set is worn improperly", and outputs the voice signal AIs when an instruction is provided by the controller 160. A voice signal AIs is not output if an instruction is not provided by the controller 160.

The sound characteristics imparter 164 is an equalizer for imparting target sound characteristics to the signal Sa. The initial sound characteristics set by the controller 160 are corrected in accordance with correction coefficients supplied by the corrector 163, and the thus corrected sound characteristics are imparted to the signal Sa by the sound characteristics imparter 164. The sound characteristics imparter 164 is an example of a first imparter. Hereafter, the sound characteristics imparted by the sound characteristics imparter 164 are sometimes referred to as first sound characteristics.

The adder 168 adds together a signal obtained by impartation of sound characteristics to the signal Sa at the sound characteristics imparter 164 and the voice signal AIs output from the voice storage device 161, to output a resultant signal. The DAC 132 converts to analog the output signal of the adder 168, and the amplifier 134 amplifies the analog signal output from the DAC 132. Based on the amplified signal output from the amplifier 134, the loudspeaker 140 causes air to vibrate and thereby transmit sound corresponding to the amplified signal.

The microphone 150 (first microphone) receives the sound output by the loudspeaker 140 in the closed space sealed with the ear pad 182. This closed space is formed when the headphone set 1a is worn by a listener. The amplifier 152 amplifies a signal derived from the sound received by the microphone 150, and the ADC 154 converts the amplified signal of the amplifier 152 into a digital signal Sf.

The determiner 162 first compares frequency characteristics of the signal Sa with those of the signal Sf, to supply to the corrector 163 information indicative of the difference between the frequency characteristics of the signal Sa and those of the signal Sf. The information indicative of the difference between the frequency characteristics of the signal Sa and those of the signal Sf is, for example, information that indicates, across different frequencies, differences in levels of the signal Sf relative to those of the signal Sa, which serves as a reference. The information indicative of the difference is sometimes referred to as difference characteristics.

The signal Sf is delayed relative to the signal Sa due to signal processing, etc. Accordingly, the determiner 162 compares the signal Sa and the signal Sf after delaying the signal Sa to match a phase thereof with a phase of the signal Sf. A method used for comparison may involve obtaining a cross spectrum between the two signals after applying a Fast Fourier Transform to each of the signal Sa and the signal Sf, for example.

The determiner 162 determines whether the difference characteristics between the frequency characteristics of the signal Sa and those of the signal Sf fall within a predetermined range from the target sound characteristics, and notifies a result of the determination to the controller 160. Specific examples of the predetermined range and the operation of the controller 160 upon receipt of the determination result will be described later.

The corrector 163 outputs correction coefficients, by use of which the difference characteristics between the frequency characteristics of the signal Sa and the frequency characteristics of the signal Sf are corrected to have designed values of the sound characteristics (target characteristics). Output from the loudspeaker 140 is a sound based on a signal obtained by imparting to the signal Sa the first sound characteristics. The sound output from the loudspeaker 140 travels within a space including the external ear canal and sealed with the ear pad 182, and is received by the microphone 150, from which sound the signal Sf is derived. Thus, the difference characteristics of the frequency characteristics of the signal Sf relative to the frequency characteristics of the signal Sa indicate the sum characteristics of the first sound characteristics and characteristics imparted when the sound is transmitted through the space. By correcting the first sound characteristics to be imparted by the sound characteristics imparter 164 such that the sum characteristics approach the target characteristics, the sound characteristics perceived by the listener, i.e., sound characteristics perceived after the sound output from the loudspeaker 140 travels through the space sealed with the ear pad 182 and reaches the eardrum of the listener, approach the target characteristics.

Such a correction, however, produces the intended results only if the listener's ear is sufficiently sealed by the ear pad 182, i.e., if the listener wears the headphone set 1a properly.

Figure 3:
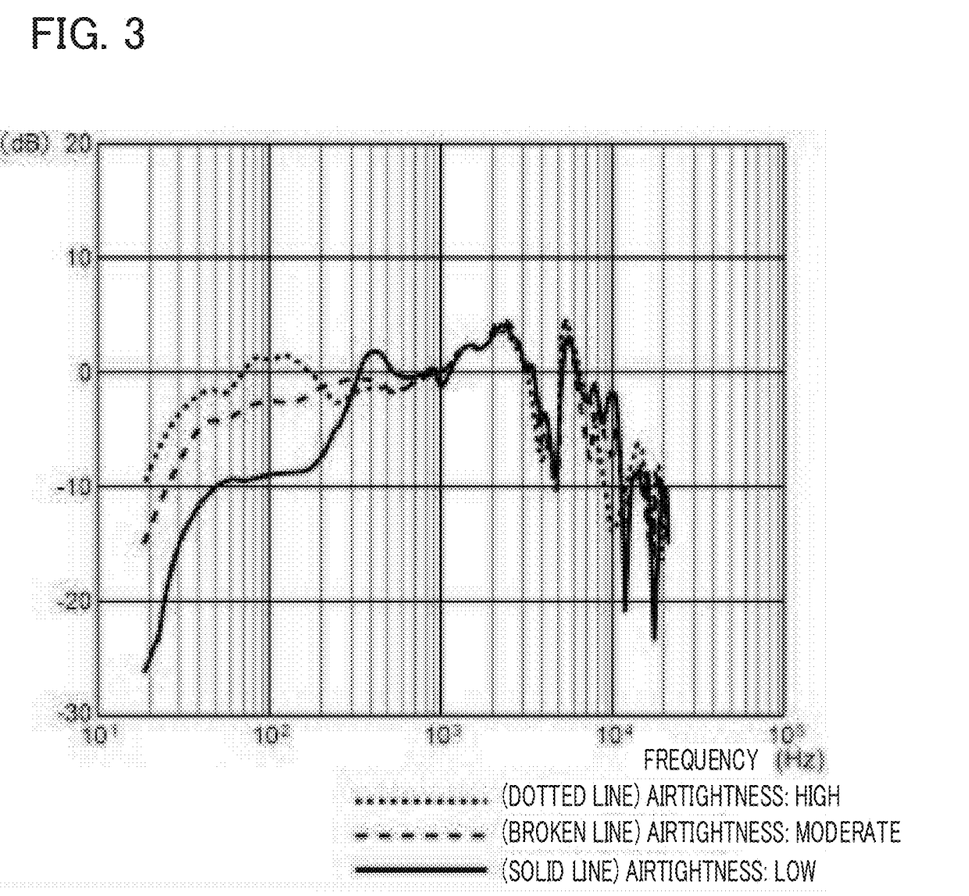
FIG. 3 is a diagram explaining frequency responses dependent on different wear-states of the headphone set.

FIG. 3 is a diagram explaining how the frequency characteristics reaching the listener's eardrum differ depending on different wear-states of the headphone set 1a. The frequency characteristics shown in the figure are results obtained by use of a dummy head equipped with a headphone set. Specifically, the headphone set is caused to output a sound based on a signal obtained by imparting target characteristics to the signal Sa, while the sound is received by a microphone provided at a position corresponding to the eardrum in the dummy head. The frequency characteristics of the sound received by the microphone are then obtained. Hence, the frequency characteristics shown in the figure correspond to frequency characteristics of the signal Sf.

The dotted line in FIG. 3 shows frequency characteristics in a case in which the headphone set is properly situated on the dummy head creating a sufficiently air-tight seal with the ear pad. The frequency characteristics of the signal Sf in this case are obtained under an ideal wear-state, and therefore are approximate frequency characteristics of a signal obtained as a result of the target characteristics being imparted to the signal Sa. The broken line in FIG. 3 shows frequency characteristics in a case in which the headphone set is placed only partially properly on the dummy head resulting in only moderate airtightness. This wear-state is one where it is assumed by a listener that the headphone set is worn properly; however, in actuality the headphone set is not worn entirely properly. The solid line in FIG. 3 shows frequency characteristics when airtightness of the ear pad is low caused by a listener improper wearing of the headphone set. For example, a case can be envisaged whereby an air gap is formed between the ear pad 182 and the listener's (i.e., wearer's) head due to intervention therebetween of temple pieces of eyeglasses, or a case n which the listener's (i.e., wearer's) ears exceed a size of the ear pad 182.

As shown in FIG. 3, discrepancies in frequency characteristics between the different wear-states are observed in a frequency range of several hundred Hz or lower. In the following, consideration is given to reasons for such frequency discrepancies. Frequency characteristics tend to be more susceptible to interference in a low frequency range than in a higher frequency range, which interference may be caused by differences in air-tight sealing of an ear pad when covering the listener's ear. Thus, when airtightness is low due to an improper wear-state of the headphone set, a level (amplitudes) of a signal in the low range will tend to decrease. In contrast to low-range frequencies, only a small difference in level is apparent in mid-range frequencies, those of approximately 1 to 2 kHz, caused by different wear-states. Thus, it can be stated that characteristics of mid-range frequencies are less susceptible to change as a result of improper wear-states of the headphone set or physical features of listeners.

A signal obtained by imparting to the signal Sa the first sound characteristics is amplified by the amplifier 134. A signal derived from a sound received by the microphone 150 is also amplified by the amplifier 152. Since the frequency characteristics of the signal Sa before the amplification and the frequency characteristics of the signal Sf after the amplification have different levels, simple comparison therebetween should be avoided. As described above, mid-range frequency characteristics are less susceptible to improper wear-states of the headphone set or physical features of listeners. Accordingly, for the determiner 162 a configuration is used that adjusts mid-range frequency characteristics of the signal Sf to have the same frequency characteristics as those of the mid-range of the signal Sa (e.g., at 1 kHz). Comparison of the two signals and calculation of differences in characteristics therebetween are then performed. By use of such a configuration, improvement in accuracy of comparison of the two signals and improvement in accuracy of calculation of difference characteristics by the determiner 162 can be attained.

Improvement in calculation accuracy of difference characteristics at the determiner 162 results in an improvement in accuracy of correction of the first sound characteristics, for impartation to the signal Sa by the sound characteristics imparter 164. As shown by the solid line of FIG. 3, in which a headphone set is worn in a state that provides only low ear pad airtightness, a level in the low range is more than 10 dB lower than the frequency characteristics (shown by the dotted line), which is approximate to frequency characteristics of a signal obtained as a result of the target characteristics imparted to the signal Sa, for example. If, in such a state, sound characteristics in the low frequency range of the first sound characteristics, which are imparted to the signal Sa by the sound characteristics imparter 164, are corrected to be at least 10 dB higher, sound characteristics of a sound heard by a listener can, in theory, be brought closer to the target characteristics. Even if such a correction as described above is performed, however, there are cases in which due to constraints it is not possible to bring the sound characteristics of a sound heard by a listener close to the target characteristics; such constraints may be, for example, an actual playback capacity of the loudspeaker 140.

Accordingly, in the present embodiment, when it is anticipated that correction will not result in sound characteristics of a sound that will be heard by a listener being brought close to the target characteristics, the headphone set 1a is configured to alert a listener accordingly, thereby prompting the listener to adjust a wear-state of the headphone set 1a to one that is proper. Specifically, a listener is alerted if a level in the difference characteristics in the low frequency range, (e.g., at 100 Hz) which is indicative of a difference in the frequency characteristics of the signal Sf relative to the frequency characteristics of the signal Sa, deviates more than 6 dB from the level of the target characteristics in the low frequency range despite adjustment of the level of the signal Sf to that of the signal Sa in the mid-range as described above.

Based on the above configuration, operation of the signal processor 16a will now be described in detail.

Figure 4:
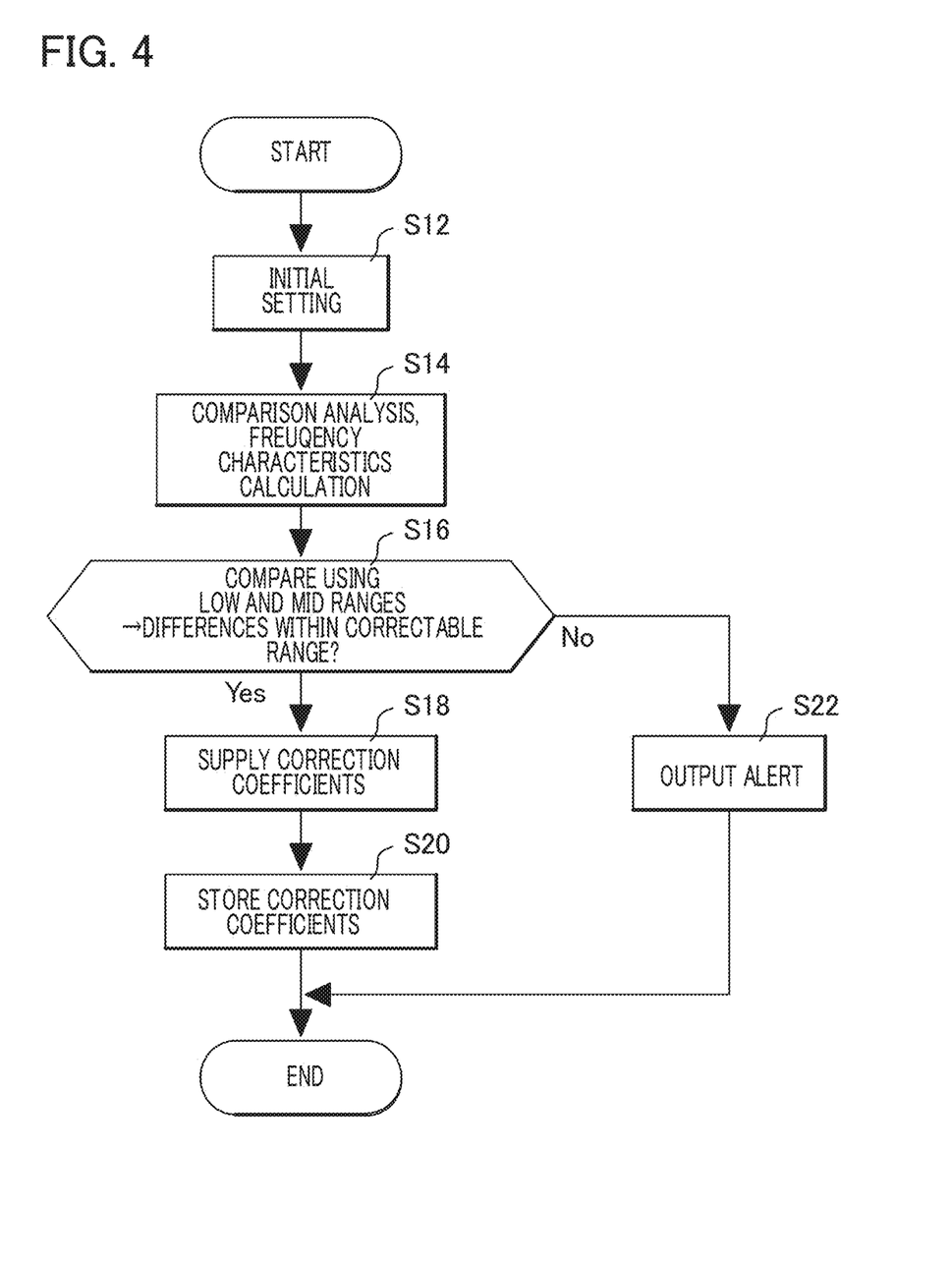
FIG. 4 is a flowchart showing an operation of the headphone set.

FIG. 4 is a flowchart illustrating control processing performed by the signal processor 16a. The control processing is performed when the signal Sa is input. More specifically, the processing is triggered: when an amplitude of the signal Sa changes from a zero state that had lasted for a certain period to a value that is greater than a threshold; when a specific operation is performed by a listener where an application program is executed at the external terminal 200; or when a power switch (not shown) is turned on.

The controller 160 first performs various initial settings (Step S12). More specifically, the controller 160 sets correction coefficients stored in the previous operation for the sound characteristics imparter 164, which is an example of performing the initial settings. Accordingly, in the initial state the sound characteristics imparter 164 is configured to impart to the signal Sa sound characteristics corrected with correction coefficients obtained by prior processing.

After the initial setting, the controller 160 instructs the determiner 162 to analyze each of the signal Sa and the signal Sf, to obtain the frequency characteristics of the two signals (Step S14). This instruction causes the determiner 162 to calculate the frequency characteristics of the signal Sa and the frequency characteristics of the signal Sf. In some embodiments, the frequency characteristics of the signal Sa are obtained by averaging the frequency characteristics over a period of time until a lapse of a time (5 seconds or longer) from input of the signal Sa.

The determiner 162, after adjusting the frequency characteristics of the signal Sf in the mid-range to match the frequency characteristics of the signal Sa in the mid-range, calculates difference characteristics between the two sets of frequency characteristics and determines whether the level of frequencies in the low range of the difference characteristics falls within a range of 6 dB (an example of a predetermined range) from the level of frequencies in the low range of the target frequency characteristics. The determiner 162 notifies a result of the determination to the controller 160 (Step S16).

The controller 160 instructs the determiner 162 to supply the calculated difference characteristics to the corrector 163 in a case where the controller 160 is notified that the level of frequencies in the low range of the difference characteristics falls within the 6-dB range from the level of frequencies in the low range of the target frequency characteristics (the determination result in Step S16 is YES). This instruction causes the determiner 162 to supply the difference characteristics to the corrector 163. The controller 160 then instructs the corrector 163 to generate correction coefficients, by application of which the difference characteristics of the signal Sf relative to the signal Sa become the target sound characteristics. This instruction causes the corrector 163 to generate correction coefficients and supplies the generated correction coefficients to the controller 160 and to the sound characteristics imparter 164 (Step S18). The sound characteristics imparter 164 corrects the initial first sound characteristics in accordance with the correction coefficients. Accordingly, characteristics of a sound that reaches an eardrum of a listener after being output from the loudspeaker 140 based on a signal obtained by imparting to the signal Sa the corrected first sound characteristics (frequency characteristics of the signal Sf derived from a sound received by the microphone 150, in actuality) will approach frequency characteristics of a signal obtained by imparting the target characteristics to the signal Sa. Thus, in the headphone set 1a by use of the above configuration, a listener is able to hear a sound derived from a signal obtained by imparting to the signal Sa characteristics approximate to the target characteristics.

If a sudden change occurs in the sound characteristics from the initial characteristics to the corrected characteristics, the difference in sound before and after the correction may disturb a listener. Accordingly, the sound characteristics may be changed from the initial characteristics to the corrected characteristics in a step-wise manner, for example, by changing the correction coefficients by interpolation.

Upon supply of the correction coefficients from the corrector 163, the controller 160 stores the correction coefficients in the internal memory (Step S20), to end the correction processing. Since the corrected first sound characteristics are maintained after processing ends, a listener is able to continuously hear a sound derived from a signal obtained by imparting to the signal Sa characteristics that approximate the target characteristics. The correction coefficients stored in the memory are read out, at a subsequent timing, such as when the signal Sa is input again or upon receipt of an instruction by a listener, and is used for the initial setting in Step S12.

On the other hand, the controller 160 outputs an instruction for output of an alert in a case where the controller 160 is notified that a level of frequencies in the low range of the difference characteristics does not fall within the 6-dB range from the level of frequencies in the low range of the target frequency characteristics (the determination result in Step S16 is NO) (Step S22). More specifically, the controller 160 outputs the signal Ald to the API 124. In the meantime, the controller 160 reads out the signal Als from the voice storage device 161, to supply the signal Als to the adder 168. The controller 160 also turns the indicator light 190 on. The signal Ald supplied to the API 124 is transmitted via the API 124 to the external terminal 200. As a result, an alert indicative that "the headphone set is not worn properly" is graphically displayed at the external terminal 200. When the voice signal Als is supplied to the adder 168, the voice signal Als is added together with a signal obtained by imparting the first sound characteristics to the signal Sa, and as a result a voice alert "the headphone set is not worn properly" is output by the loudspeaker 140. Moreover, the indicator light 190 turns on.

Since the alerts can be indicated by light and/or voice a listener can be alerted to an improper wear-state of the headphone set 1a. Thus, the listener is prompted to change the wear-state of the headphone set 1a, or to use an ear pad that better fits the user's ear, and to once more wear the headphone set 1a. If the determination result in Step S16 is YES after the listener once more wears the headphone set 1a, the listener will hear a sound derived from a signal obtained by imparting to the signal Sa characteristics that approximate the target characteristics. It is of note that no indicator light 190 is provided for the right ear in the headphone unit 10R. If the wear-state of the headphone unit 10R only is not proper, the controller 160 of the headphone unit 10R notifies the controller 160 of the headphone unit 10L for the left ear to that effect, and the indicator light 190 of the headphone unit 10L turns on.

According to the headphone set 1a of the present embodiment, sound characteristics can be corrected by using a signal indicative of content to be heard by a listener, without requiring use of special tone signals exclusive for measurements. That is, according to the headphone set 1a, sound characteristics are corrected in the background with a listener listening to a sound of content. Therefore, according to the headphone set 1a, sound characteristics are corrected without a listener being made aware that the sound characteristics are being corrected, i.e., without subjecting a listener to intrusive tone signals.

Furthermore, if it is determined that the headphone set 1a is worn properly, sound characteristics to be imparted to the signal Sa are corrected so as to approach target characteristics. On the other hand, if it is determined that the headphone set 1a is worn improperly, an alert to that effect is output. Thus, according to the headphone set 1a, a listener is able to realize that the headphone set 1a is not properly worn even in a case that the listener thought that the wear-state was proper. In particular, if a listener is not able to realize that the target characteristics are not imparted, s/he may be caused to misunderstand that the headphone set 1a has only a limited capacity. However, according to the present embodiment, no such misunderstanding will be caused to the listener.

It is of note that in the present embodiment the difference characteristics and the target characteristics are compared in the low frequency range (especially in the level at 100 Hz. However, the target of comparison and/or the magnitude of the difference are not limited to the examples given in the embodiment as sound characteristics may depend on the actual headphone set, especially an airtightness of ear pads and/or output characteristics of a loudspeaker.

Second Embodiment

A headphone set according to a second embodiment will now be described. In the second embodiment a listen-through capability and a noise cancelling capability are added to the headphone set 1a according to the first embodiment.

Figure 5:
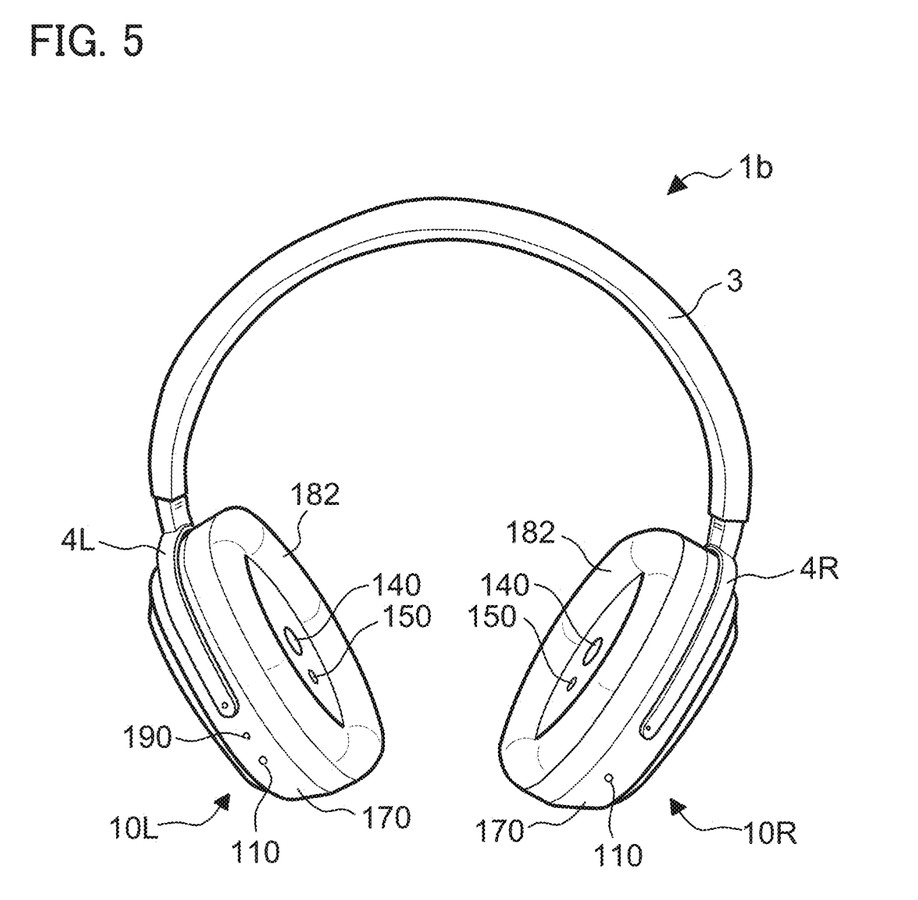
FIG. 5 is a diagram showing an external view of a headphone set according to a second embodiment.
Figure 6:
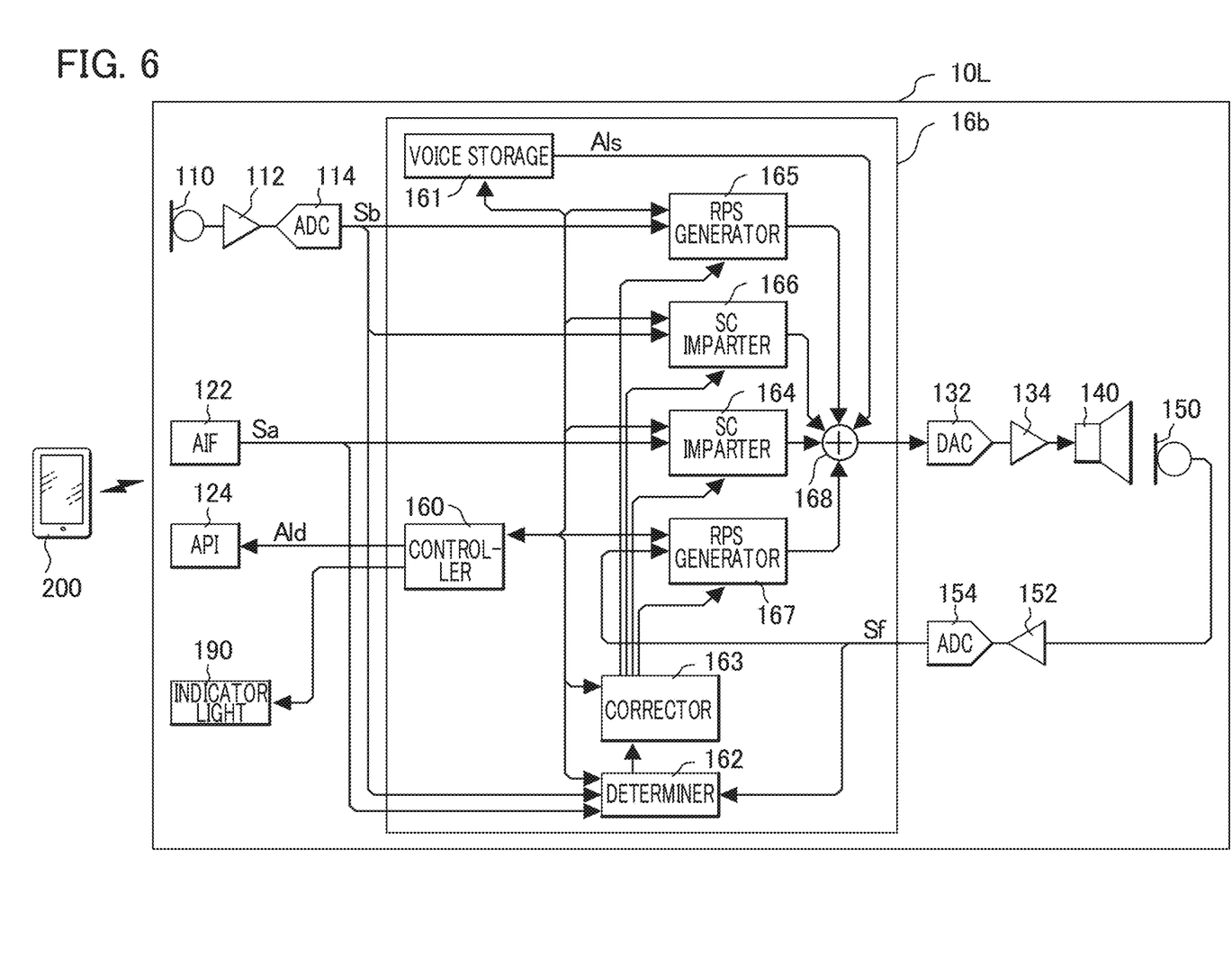
FIG. 6 is a block diagram showing a configuration of the headphone set.

FIG. 5 is a diagram illustrating an external view of a headphone set 1b according to the second embodiment. FIG. 6 is a block diagram illustrating a configuration of the headphone set 1b for one of the two channels. In contrast to the headphone set 1a (refer to FIG. 1), a microphone 110 (second microphone) is mounted on each of the right and left housings 170 in the headphone set 1b, as shown in FIG. 5. The microphone 110 receives ambient sound of a listener who wears the headphone set 1b.

As shown in FIG. 6, the headphone set 1b additionally includes the microphone 110, an amplifier 112, and an ADC 114, in contrast to the headphone set 1a (refer to FIG. 2). Also, in the headphone set 1b, a signal processor 16b is provided in place of the signal processor 16a. The amplifier 112 amplifies a signal derived from a sound received by the microphone 110, and the ADC 114 converts an analog signal amplified by the amplifier 112 into a digital signal Sb. The signal processor 16b further includes a reverse-phase signal generator (RPS generator) 165, a sound characteristics imparter (SC imparter) 166, and a reverse-phase signal generator (RPS generator) 167. These elements are not provided in the signal processor 16a.

The reverse-phase signal generator 165 generates a reverse-phase signal to enable feed-forward noise cancelling. The reverse-phase signal has almost the same amplitudes as the signal Sb across a relatively wide frequency band, but is phase-inverted relative to the signal Sb. Therefore, if a sound based on the reverse-phase signal of the signal Sb is output from the loudspeaker 140, it may be expected that ambient sound relative of a listener would be minimized. In actuality, however, a sound output from the loudspeaker 140 reaches an eardrum after traveling through the listener's external ear canal. The listener of the headphone set 1b perceives a sound output from the loudspeaker 140 with transmission characteristics imparted thereto, where the transmission characteristics are imparted while the sound travels through a space via the external ear canal to the eardrum. Transmission characteristics differ depending on listeners. Accordingly, it is necessary to cancel transmission characteristics from the signal Sb to ensure that the ambient sound is minimized. That is, reverse characteristics of the transmission characteristics of a listener of the headphone set 1b, i.e., characteristics that cancel the transmission characteristics, need to be imparted to the signal Sb.

In a case where no signal Sb is input, a signal obtained by imparting to a signal Sa first sound characteristics is output as a sound; the sound travels through the listener's external ear canal, and is then received by the microphone 150. A signal derived from a sound received by the microphone 150 will be a signal Sf. The difference characteristics indicate the sum characteristics of the first sound characteristics and the transmission characteristics as described above. Accordingly, characteristics obtained by deducting the first sound characteristics from the difference characteristics will be transmission characteristics that are unique to a listener who wears the headphone set 1b. Thus, the reverse-phase signal generator 165 imparts, to a reverse-phase signal of the signal Sb, reverse characteristics of transmission characteristics that are unique to a listener as described below.

Specifically, the determiner 162 first supplies difference characteristics of the signal Sf relative to the signal Sa to the corrector 163 when the signal Sb is almost soundless. The corrector 163 next calculates the transmission characteristics of a listener who wears the headphone set 1b based on the difference characteristics in the manner described above, to supply the reverse characteristics of the transmission characteristics to the reverse-phase signal generator 165. The reverse-phase signal generator 165 then imparts reverse characteristics of the transmission characteristics to the generated reverse-phase signal of the signal Sb based on the information supplied from the corrector 163. It is of note that the reverse-phase signal generator 165 may initially impart the reverse characteristics of transmission characteristics of a general or an average listener to the reverse-phase signal of the signal Sb, and the reverse-phase signal generator 165 may then correct the characteristics to be imparted to the reverse-phase signal of the signal Sb with correction coefficients. In this case, the corrector 163 may output the correction coefficients that cause the transmission characteristics to approach the transmission characteristics as calculated based on the difference characteristics (the transmission characteristics of a listener who wears the headphone set 1b).

The sound characteristics imparter 166 imparts predetermined sound characteristics (second sound characteristics) to the signal Sb for the purpose of listen-through capability. The listen-through capability enables a listener wearing the headphone unit 1b to hear voices such as conversation or announcements within the ambient sound in a natural sounding manner, rather than as unnatural, muffled sounds, even if the ear canal of the listener is air tightly sealed under coverage of the ear pad 182. It is also necessary to consider transmission characteristics from the loudspeaker 140 to the listener's eardrum for impartation of the sound characteristics by the sound characteristics imparter 166. Accordingly, in the present embodiment, the determiner 162 supplies the difference characteristics of the signal Sf relative to the signal Sa to the corrector 163; the corrector 163 supplies the transmission characteristics of a listener who wears the headphone set 1b to the sound characteristics imparter 166; and the sound characteristics imparter 166 imparts characteristics obtained by correcting the second sound characteristics based on the transmission characteristics to the signal Sb. It is of note that, as described above, the corrector 163 obtains the transmission characteristics unique to the listener of the headphone set 1b by deducting the first sound characteristics from the difference characteristics. The sound characteristics imparter 166 is an example of a second imparter. The sound characteristics imparted by the sound characteristics imparter 166 may in some instances be referred to as the second sound characteristics. The second sound characteristics are controlled based on the difference characteristics between the signal Sa and the signal Sf obtained by the determiner 162.

The reverse-phase signal generator 167 generates a reverse-phase signal of the signal Sf to enable feed-back noise cancelling. It is also necessary to consider the transmission characteristics from the loudspeaker 140 to the listener's eardrum for generation of the characteristics of a reverse-phase signal by the reverse-phase signal generator 167. Accordingly, the reverse-phase signal generator 167 is configured to impart characteristics based on the transmission characteristics supplied by the corrector 163 to the reverse-phase signal of the signal Sf.

The adder 168 according to the second embodiment adds together the following signals. Specifically, the adder 168 adds together a signal obtained by impartation of the first sound characteristics to the signal Sa by the sound characteristics imparter 164, the reverse-phase signal generated by the reverse-phase signal generator 165, the signal obtained by impartation of the second sound characteristics to the signal Sb by the sound characteristics imparter 166, and the reverse-phase signal generated by the reverse-phase signal generator 167. The adder 168 supplies a resultant signal to the DAC 132. Accordingly, in the headphone set 1b, the loudspeaker 140 outputs a sound based on the output from the adder 168.

According to the headphone set 1b of the second embodiment, the same effects as those of the headphone set 1a of the first embodiment can be attained. Moreover, the ambient sound, which is noise, can be minimized without fail, while a listener is able to hear informative voices such as conversations or announcements within the ambient sound in a natural-sounding manner.

Similarly to the headphone set 1a, in the headphone set 1b, the signal Sa representative of content is used to correct the first sound characteristics to be imparted to the signal Sa. In contrast to the headphone set 1a, the headphone set 1b is configured to receive the ambient sound by use of the microphone 110, and therefore, the level of the ambient sound, which is noise, can be accurately obtained. The obtained level of the ambient sound can then be used in correcting the first sound characteristics and the second sound characteristics. In a case where the ambient sound is relatively large, the components of the ambient sound are added to the signal Sf. As a result, the difference characteristics of the signal Sf relative to the signal Sa become inaccurate, and it is thus not possible to accurately correct the sound characteristics. Accordingly, only in a case where it is determined by the determiner 162 that the level of the background noise other than a sound based on the signal Sa (i.e., the level of the ambient sound received by the microphone 110) is less than a threshold, does the controller 160 perform the control processing described in the following, in response to receiving the determination result. Specifically, the controller 160 controls the determiner 162 to calculate the difference characteristics of the signal Sf relative to the signal Sa, and also controls the corrector 163 to output correction coefficients that correct the difference characteristics to be the target characteristics.

In the headphone set 1b, the feed-forward noise cancelling capability and feed-back noise cancelling capability may be switched on or off by an instruction provided by a listener, either separately or together (e.g., in a case where a specific operation is made to the external terminal 200, and the controller 160 receives a notification relating to the specification operation via the AIF 122). Specifically, the adder 168 may add at least one of a reverse-phase signal of a signal derived from a sound received by the microphone 150 or a reverse-phase signal of a signal derived from a sound received by the microphone 110 (i.e., either or both of the two signals) to a signal obtained by impartation of the first sound characteristics to the signal Sa by the sound characteristics imparter 164. In this configuration, the correction of the first sound characteristics, to be imparted to the signal Sa by the sound characteristics imparter 164, and the correction of the second sound characteristics, to be imparted to the signal Sb by the sound characteristics imparter 166, may be performed only when the noise cancelling capability is on.

Third Embodiment

In the first embodiment and second embodiment, the headphone sets 1a and 1b are respectively described as examples of the sound output device, but the sound output device may instead be an earphone.

Figure 7:
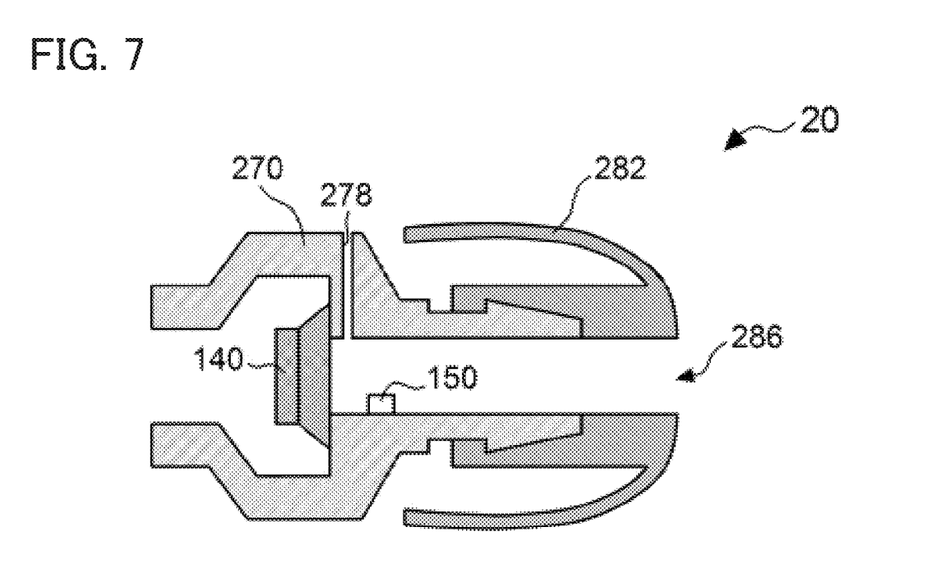
FIG. 7 is a diagram showing a structure of an earphone according to a third embodiment.

FIG. 7 is a diagram showing a structure of an earphone 20, which is an example of the sound output device according to a third embodiment. As shown in the figure, the earphone 20 is an in-ear earphone, and includes a housing 270 and an earbud 282. The housing 270 is generally cylindrical in shape. In an interior space of the housing 270, there are provided a loudspeaker 140 and a microphone 150. More specifically, the loudspeaker 140 is disposed in such a manner that it compartmentalizes the interior space of the housing 270, and the sound output from the loudspeaker 140 is directed to the external ear canal of the user. Within the interior space of the housing 270 compartmentalized by the loudspeaker 140, the microphone 150 is mounted to be located closer to the external ear canal than the loudspeaker 140 (is mounted to be located to the right of the loudspeaker 140 in FIG. 7). Within the interior space of the housing 270 compartmentalized by the loudspeaker 140, there are provided one or more vents 278 that allow ventilation of outside air, and that are located closer to the external ear canal than the loudspeaker 140.

The earbud 282 is formed of an elastic material, such as polyvinyl or sponge, and is formed into a bullet shape with a hollow cavity that opens at an opening 286. The earbud 180 is detachably attached to the housing 270 at a side of the external ear canal. When the earbud 282 is attached to the housing 270, the opening 286 communicates with the interior space of the housing 270.

The electric configuration of the earphone 20 is the same as that of the headphone set 1a shown in FIG. 2. Specifically, the earphone 20 includes an AIF 122, a signal processor 16a, a DAC 132, amplifiers 134 and 152, a loudspeaker 140, a microphone 150, and an ADC 154, among which illustrations of elements other than the loudspeaker 140 and the microphone 150 are omitted in FIG. 7. It is of note that within the interior space of the housing 270 compartmentalized by the loudspeaker 140, the above elements are located on an opposing side of the external ear canal (are located to the left of the loudspeaker 140 in FIG. 7).

Figure 8:
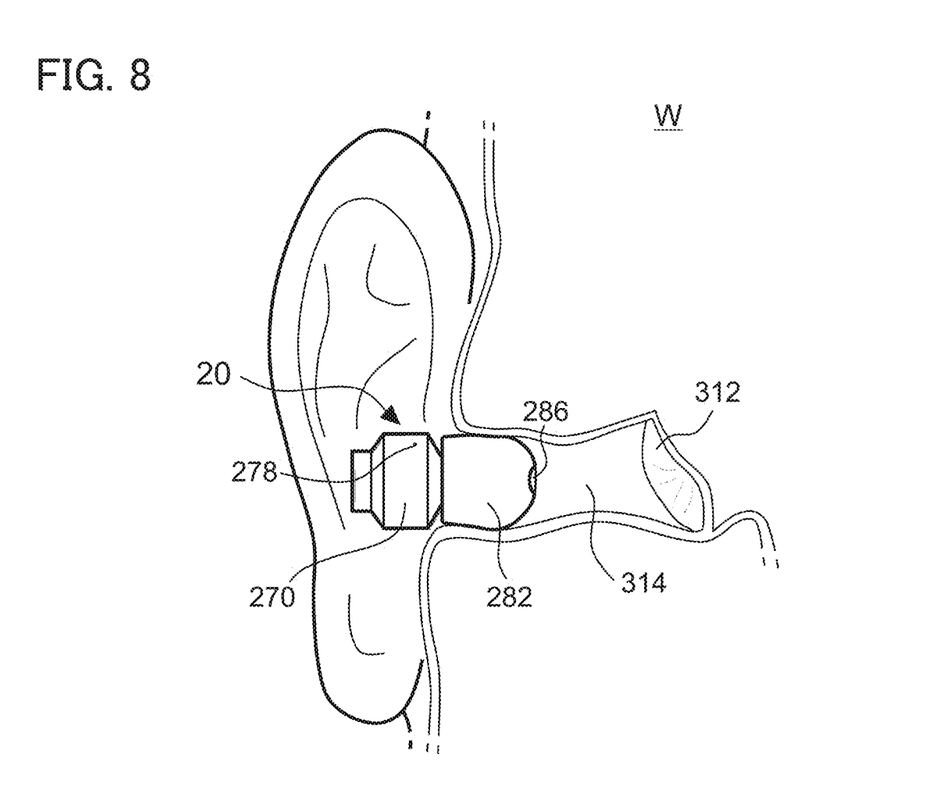
FIG. 8 is a diagram showing a wear-state of the earphone.

FIG. 8 illustrates a wear-state of the earphone 20. Specifically, the figure illustrates how the earphone 20 is worn on the right ear of a listener W. As illustrated in FIG. 8, the earbud 282 of the earphone 20 is inserted into the external ear canal 314. More specifically, the earbud 282 is inserted into the external ear canal 314 in a direction in which the opening 286 faces the eardrum 312, while a part of the housing 270 remains outside of the external ear canal 314. An earphone for the left ear (not shown) is the same as the earphone 20 for the right ear.

FIG. 8 shows a proper wear-state of the earphone 20. To realize the proper wear-state, it is necessary for the listener to select an earbud 282 that is suited to the shape and/or the diameter of the external ear canal 314, such that an airtightness of the external ear canal 314 sealed by the earbud 282 is high. Description will now be given of how the frequency characteristics of a sound vary when the airtightness is high or low depending on a wear-state of the earphone 20.

Figure 9:
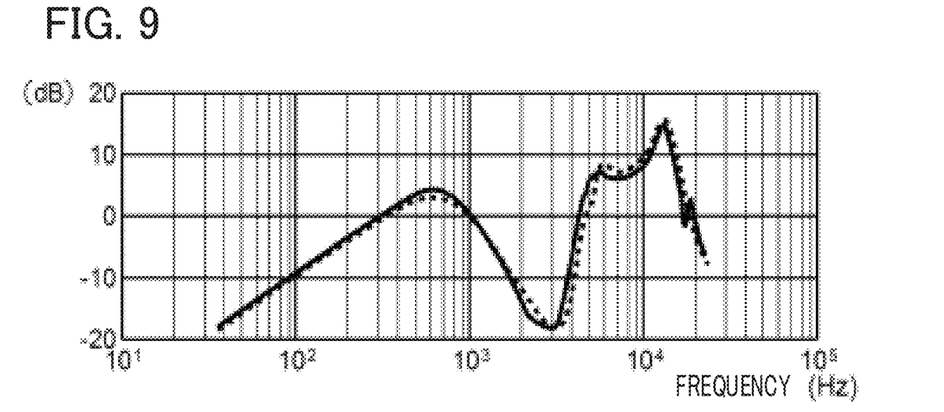
FIG. 9 is a diagram explaining frequency responses dependent on different wear-states of the earphone.

FIG. 9 illustrates frequency characteristics in a case where the earphones 20 for the left ear are worn properly, i.e., high airtightness by sealing with the earbud 282 is attained. Specifically, the figure shows frequency characteristics of a sound received by the microphone 150 in a case where a subject wears the earphone 20 properly and a sound having given frequency characteristics is output from the loudspeaker 140. In FIG. 9, the dotted line shows average characteristics of the frequency characteristics for a dozen subjects, and the solid line shows the frequency characteristics for a particular subject of focus among the subjects.

Figure 10:
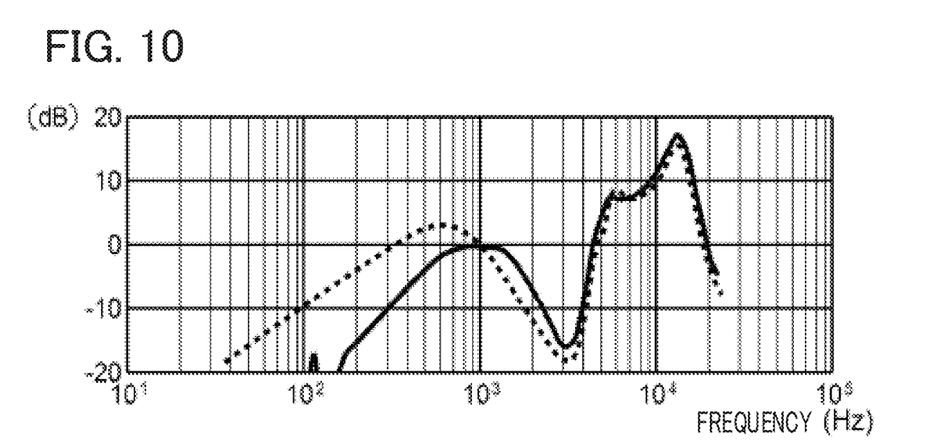
FIG. 10 is a diagram explaining frequency responses dependent on different wear-states of the earphone.

FIG. 10 illustrates frequency characteristics in a case where the earphone 20 for the right ear is worn. More specifically, the dotted line shows average characteristics of the frequency characteristics for the subjects when the earphone 20 for the right ear is worn properly. The solid line illustrates frequency characteristics when the earphone 20 for the right ear is worn by the particular subject improperly, i.e., the airtightness attained by sealing with the earbud 282 is low because the inner diameter of the external ear canal 314 is smaller than the size of the earbud 282. As shown by the solid line in FIG. 10, when the airtightness is low, the sound level decreases in the low frequency range equal to or lower than 800 Hz. In such a case, even if the first sound characteristics are corrected, the target characteristics cannot be achieved. However, according to the earphone 20 of the third embodiment, an alert is output, and the listener is made aware of the wear-state.

Furthermore, as will be understood from the illustrations in FIG. 10, the sound level in the low frequency range when the earphone 20 is worn improperly is at least 10 dB lower than the sound level in the low frequency range when the earphone 20 is worn properly, while the sound levels are the same in the middle frequency range. Accordingly, substantially the same process as described in Step S16 with respect to the headphone set 1a or 1b can be employed to determine whether the earphone 20, which has the characteristics shown in FIG. 10, is worn properly.

In the example depicted by the solid line in FIG. 10, the particular subject wears in the right ear an earphone 20 on which there is mounted the same type (the same diameter) of the earbud 282 as that worn in the left ear of the subject. In this case, the inner diameter of the external ear canal 314 of the right ear of the particular subject is greater than that of the external ear canal 314 of the left ear of the subject. Thus, it is apparent that in a case where the same earbud 282 is used for the right and left ears, while a high airtightness is attained for the left ear, the same is not attained for the right ear. In fact, it is known that in some people differences exist between inner diameters of their right and left external ear canals.

The earphone 20 corrects the first sound characteristics by use of a signal representative of content, similarly to the headphone sets 1a and 1b. Accordingly, sound characteristics are corrected without a listener being made aware that the sound characteristics are being corrected, i.e., without subjecting the listener to intrusive tone signals. Furthermore, if it is determined that the earphone 20 is worn improperly, an alert to that effect is output. Therefore, the listener is made aware that the earphone 20 is not properly worn. Accordingly, the listener is able to change the wear position of the earphone 20, or replace the earbud 282, and thereby is able to hear a sound to which the target characteristics are imparted.

APPENDIX

Aspects such as in the following are derivable from the above described embodiments, etc.

Aspect 1

A sound output device according to an aspect 1 of the present disclosure includes: a first imparter configured to impart first sound characteristics to an input signal; a loudspeaker configured to output a sound based on a signal obtained by impartation of the first sound characteristics to the input signal by the first imparter; a first microphone configured to receive a sound based on the sound output by the loudspeaker; a determiner configured to obtain difference characteristics between frequency characteristics of the input signal and frequency characteristics of a signal derived from the sound received by the first microphone, and configured to determine whether the difference characteristics fall within a predetermined range from target sound characteristics; and an instruction indicator configured to output an instruction for output of an alert when a result of the determination by the determiner is negative. The first imparter is further configured to correct the first sound characteristics based on the difference characteristics when a result of the determination by the determiner is positive.

According to aspect 1, in a configuration of outputting a sound obtained by imparting target sound characteristics to an input signal such that a listener is able to hear such a sound, the sound characteristics imparted to the input signal are corrected in accordance with the frequency characteristics of an actually output sound. Therefore, the listener is able to hear, with high accuracy, a sound that is close to a sound in which the target sound characteristics are realized. On the other hand, if it is assumed that such a correction is hindered for some reason, an output instruction of an alert is output, and therefore, a listener is made aware of a state in which the target sound is not realized.

Aspect 2

A sound output device according to an aspect 2 is the sound output device according to aspect 1, in which the instruction indicator is configured to output, as the instruction for output of the alert, an instruction to add a voice signal representative of the alert to the signal obtained by impartation of the first sound characteristics to the input signal.

According to aspect 2, a listener is made aware of a state in which the target sound is not realized by means of an alert, the alert being notified in the form of voice when s/he wears the sound output device.

Aspect 3

A sound output device according to an aspect 3 is the sound output device according to aspect 1, in which the input signal is supplied from an external terminal, and the instruction for output of the alert is output from the instruction indicator to the external terminal.

According to aspect 3, a listener is made aware of a state in which the target sound is not realized by way of an alert that is displayed at the external terminal, etc.

Aspect 4

A sound output device according to an aspect 4 is the sound output device according to aspect 1, in which the instruction for output of the alert controls an indicator light.

According to aspect 4, a listener is made aware of a state in which the target sound is not realized by way of an alert that is a flashing or constant glow, etc., of an indicator light.

Aspect 5

A sound output device according to an aspect 5 is the sound output device according to any one of aspects 1 to 4, in which the sound output device further includes: a second microphone configured to receive ambient sound; a second imparter configured to impart second sound characteristics to a signal derived from the ambient sound received by the second microphone; and an adder configured to generate a resultant signal by adding together the signal obtained by impartation of the first sound characteristics to the input signal by the first imparter and a signal obtained by impartation of the second sound characteristics to the signal derived from the ambient sound received by the second microphone by the second imparter. The second imparter is further configured to correct the second sound characteristics based on the difference characteristics obtained by the determiner, and the loudspeaker is configured to output the sound based on the resultant signal.

According to aspect 5, a listener is able to hear voices such as conversations or announcements as ambient sound in a natural sounding manner.

Aspect 6

A sound output device according to an aspect 6 is the sound output device according to aspect 5, in which the adder is further configured to add at least one of a reverse-phase signal of the signal derived from the sound received by the first microphone or a reverse-phase signal of the signal derived from the ambient sound received by the second microphone.

According to aspect 6, an ambient sound can be minimized.

DESCRIPTION OF REFERENCE SIGNS 1A, 1B . . . headphone set, 20 . . . earphone, 16A, 16B . . . signal processor, 110, 150 . . . microphone, 140 . . . loudspeaker, 160 . . . controller, 162 . . . determiner, 163 . . . corrector, 164, 166 . . . sound characteristics imparter, 165, 167 . . . reverse-phase signal generator, 168 . . . adder, 190 . . . indicator light, 200 . . . external terminal.

What is claimed is:

1. A sound output device comprising:
a first imparter configured to impart first sound characteristics to an input signal;
a loudspeaker configured to output a sound based on a signal obtained by impartation of the first sound characteristics to the input signal by the first imparter;
a first microphone configured to receive a sound based on the sound output by the loudspeaker;
a determiner configured to
adjust mid-range frequencies characteristics of a signal derived from the sound received by the first microphone to have the same frequency characteristics as the mid-range frequencies of the input signal,
after the mid-range frequencies characteristics adjustment, obtain difference characteristics between frequency characteristics of the input signal and frequency characteristics of a signal derived from the sound received by the first microphone, and
determine whether a level of frequencies in a low range of the difference characteristics falls within a predetermined range from a level of frequencies in the low range of target difference characteristics; and
an instruction indicator configured to
output an instruction for output of an alert when a result of the determination by the determiner is outside of the predetermined range, and
correct the first sound characteristics based on the difference characteristics when a result of the determination by the determiner is positive within the predetermined range.

2. The sound output device according to claim 1, wherein the instruction indicator is configured to output, as the instruction for output of the alert, an instruction to add a voice signal representative of the alert to the signal obtained by impartation of the first sound characteristics to the input signal.

3. The sound output device according to claim 1, wherein the input signal is supplied from an external terminal, and the instruction for output of the alert is output from the instruction indicator to the external terminal.

4. The sound output device according to claim 1, wherein the instruction for output of the alert controls an indicator light.

5. The sound output device according to claim 1, further comprising:
a second microphone configured to receive ambient sound;
a second imparter configured to impart second sound characteristics to a signal derived from the ambient sound received by the second microphone; and
an adder configured to generate a resultant signal by adding together the signal obtained by impartation of the first sound characteristics to the input signal by the first imparter and a signal obtained by impartation of the second sound characteristics to the signal derived from the ambient sound received by the second microphone by the second imparter, wherein
the second imparter is further configured to correct the second sound characteristics based on the difference characteristics obtained by the determiner, and
the loudspeaker is configured to output the sound based on the resultant signal.

6. The sound output device according to claim 5, wherein the adder is further configured to add at least one of a reverse-phase signal of the signal derived from the sound received by the first microphone or a reverse-phase signal of the signal derived from the ambient sound received by the second microphone.

7. A sound output method, comprising the acts of:
imparting first sound characteristics to an input signal;
adjusting mid-range frequencies characteristics of a signal derived from a received sound output based on a signal obtained by impartation of the first sound characteristics to the input signal to have the same frequency characteristics as the mid-range frequencies of the input signal;
after the mid-range frequencies characteristics adjustment, obtaining difference characteristics between frequency characteristics of the input signal and the corrected frequency characteristics;
determining whether a level of frequencies in a low range of the obtained difference characteristics falls within a predetermined range from a level of frequencies in a low range of target difference characteristics;
if outside of predetermined range, outputting an instruction for output of an alert, and
if within the predetermined range, correcting the first sound characteristics based on the difference characteristics.

8. The sound output method according to claim 7, wherein the outputting the instruction for output of the alert includes outputting an instruction to add a voice signal representative of the alert to the signal obtained by impartation of the first sound characteristics to the input signal.

9. The sound output method according to claim 7, wherein the input signal is supplied from an external terminal, and the outputting the instruction for output of the alert includes instructing the external terminal to output the alert.

10. The sound output method according to claim 7, wherein
the outputting the instruction for output of the alert includes controlling an indicator light to output the alert.

11. The sound output method according to claim 7, further comprising the acts of:
imparting second sound characteristics to a signal derived from a received ambient sound;
correcting the second sound characteristics based on the difference characteristics;
generating a resultant signal by adding together the signal obtained by impartation of the first sound characteristics to the input signal and a signal obtained by impartation of the second sound characteristics to the signal derived from the received ambient sound; and
outputting the resultant signal to the loudspeaker.

12. The sound output method according to claim 11, wherein
the generating the resultant signal by adding together the signal obtained by impartation of the first sound characteristics to the input signal and the signal obtained by impartation of the second sound characteristics to the signal derived from the received ambient sound includes further adding at least one of a reverse-phase signal of the signal derived from the received sound which was based on the signal obtained by impartation of the first sound characteristics to the input signal, or a reverse-phase signal of the signal derived from the received ambient sound.

* * * * *